United States Patent

Larsen et al.

[15] 3,668,755

[45] June 13, 1972

[54] BONDING OF METALLIC MEMBERS WITH LITHIUM AND LITHIUM CONTAINING ALLOYS

[72] Inventors: Earl I. Larsen, Indianapolis, Ind.; Richard H. Krock, Weston, Mass.

[73] Assignee: P. R. Mallory & Co. Inc., Indianapolis, Ind.

[22] Filed: Jan. 25, 1971

[21] Appl. No.: 109,329

[52] U.S. Cl. ................................................29/199, 29/504
[51] Int. Cl. .....................................B32b 15/16, B32b 15/20
[58] Field of Search .................................29/191, 199, 504

[56] References Cited

UNITED STATES PATENTS

| | | | |
|---|---|---|---|
| 2,123,384 | 7/1938 | Silliman | 29/199 |
| 3,011,256 | 12/1961 | Bredzs | 29/504 |
| 3,163,500 | 12/1964 | Konrad et al. | 29/199 X |
| 3,220,808 | 11/1965 | Davies | 29/504 X |
| 3,222,775 | 12/1965 | Whitney | 29/497 |
| 3,271,852 | 9/1966 | Long | 29/494 |
| 3,358,356 | 12/1967 | Long | 29/504 X |
| 3,401,025 | 9/1968 | Whitney | 29/191 |

FOREIGN PATENTS OR APPLICATIONS

| | | | |
|---|---|---|---|
| 707,835 | 4/1954 | Great Britain | 29/199 |

*Primary Examiner*—L. Dewayne Rutledge
*Assistant Examiner*—J. E. Legru
*Attorney*—Richard H. Childress, Robert F. Meyer and Henry W. Cummings

[57] ABSTRACT

Bonding of copper and copper containing alloys or silver or silver containing alloys to copper or copper alloys or to silver or silver containing alloys through the use of lithium or a lithium containing alloys.

42 Claims, 6 Drawing Figures

INVENTORS
EARL I. LARSEN
BY RICHARD H. KROCK

ATTORNEY

BONDING OF METALLIC MEMBERS WITH LITHIUM AND LITHIUM CONTAINING ALLOYS

In order to bond a copper member to another copper member or to a silver member in most instances a brazing operation is carried out in order to obtain a sound joint.

However, there are certain disadvantages to this brazing operation. In the first place, the use of many brazing alloys results in the formation of low melting constituents which limit the use of the brazed joint in its elevated temperature application.

Secondly, often the brazed assembly is softened by the annealing effect of the heating during brazing. Thus, the yield strength, tensile strength and/or hardness of the component members is substantially reduced after the brazing operation. This is true whether the hardening has been affected by cold working, precipitation hardening or dispersion hardening.

Thirdly, often times brittle intermetallic compounds are formed between the members or members being brazed and the brazing alloy composition. Thus, the resulting brazed joint is sometimes brittle.

Finally, the brazing operation is not an inexpensive operation. The cost of the brazing alloy together with the cost of effecting the heating of the brazing alloy with members to be bonded together is a significant cost item. It may show up for instance in the electric bill the gas bill of the company effecting the brazing.

It therefore is a first object of the present invention to provide a method of bonding copper or silver containing members to each other and/or to other copper or silver containing members which avoids the disadvantages of the conventional brazing techniques.

It is another object of the present invention to bond members together which does not result in the softening of the members during bonding.

It is another object of the present invention to bond members together with a technique that does not result in the formation of low melting constituents at the brazed joint.

It is another object of the present invention to provide a method of bonding members together in which the brazed joint does not become brittle after the brazing operation.

It is another object of the present invention to provide a method of bonding members together which is less expensive than the conventional brazing technique.

Other objects will be apparent from the following description and drawings.

SUMMARY OF THE INVENTION

Figure 1:
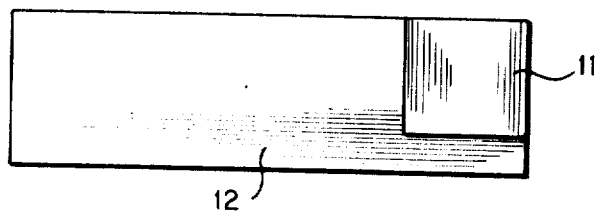
FIG. 1 is a top view of an assembly to be bonded together in accordance with the present invention.
Figure 2:
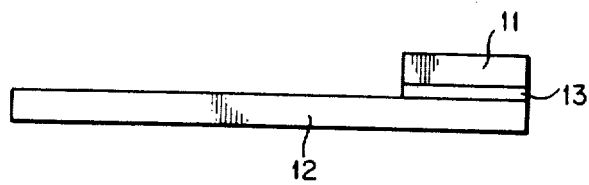
FIG. 2 is a side view of the assembly of FIG. 1 showing the bonding agent of the present invention prior to bonding.

Lithium and lithium containing alloys are utilized to bond copper, copper alloys, silver and silver alloy containing members to other copper, copper alloys, silver and/or silver alloys at temperatures below 600° C, with or without the application of pressure to the members to be bonded together. While lithium may be used alone, it is preferably utilized in alloy form; for example, alloys of lithium and copper, lithium and silver, lithium and magnesium and ternary alloys such as copper-silver-lithium, copper-lithium-bismuth, silver-lithium-bismuth, silver-lithium-lead, and silver-lithium-thallium may be used.

DETAILED DESCRIPTION

A copper or copper alloy or silver or silver alloy may be bonded to another copper or copper alloy or silver or silver alloy member in accordance with the present invention. Exemplary copper members include oxygen free copper, tough pitch copper and phosphor deoxidized copper. See for example Copper Development Association Numbers 102, 104, 105, 107, 110, 113, 114, 116, 122, and 145.

Exemplary copper alloys include brasses, bronzes, cupro-nickel(s) and Muntz metal. As is known by those skilled in the art, the zinc content in such alloys may vary all the way from a fraction of percent up to 50 percent. It is intended to cover such alloys as commercial bronze, jewelry bronze, red brass, low brass, brass, yellow brass, Muntz metal, leaded bronze, aluminum bronze and silicon additive bronzes. Exemplary CDA numbers for these various materials include Numbers 220, 226, 230, 240, 260, 268, 270, 280, 314, 330, 340, 360, 365–368, 614, 619, 638 and 639.

Additionally, copper alloys containing hardening elements such as cobalt, nickel, zirconium, beryllium, chromium, may be utilized. Generally, chromium may be present in an amount from 0.1 to 1.5%, beryllium in an amount 0.3 to about 2.5%, cobalt in an amount from about 0.5 to 3% and nickel in an amount 0.5 to 3%. Additionally, the silicon may be utilized for example in an amount from about 2 to 8%, manganese up to 15%, aluminum in an amount of about 2 to 10% and tin in an amount from about 5 to 15%. Exemplary CDA numbers for these type of materials include numbers 150, 172, 182, 405, 422, 425, 510 and 521. It will be apparent from the foregoing that the process of the invention may be applied to all or nearly all of the currently available copper based materials.

Additionally, refractory metal composites of tungsten and/or molybdenum having infiltrated therein copper and/or silver or silver or copper alloys may be bonded according to the present invention. Preferably the refractory metal content is at least 30% by weight, with or without minor amounts of additives.

Additionally, silver and silver base alloys may be bonded. For example, silver-cadmium, silver-copper and silver-nickel and silver-lead alloys may be used. Cadmium is generally alloyed with silver in an amount up to 25 percent. Silver and copper compositions may be utilized in any amount, as may silver and nickel alloys. Lead is generally added in silver alloys in an amount not greater than about 15 percent.

With respect to the bonding agent, lithium alone or lithium containing small amounts of additives may be utilized. As known by those familiar with lithium, lithium and certain lithium containing materials are very difficult to handle. They react very rapidly with water, nitrogen, hydrogen, oxygen and other chemicals. While lithium may be utilized alone if careful work is carried out it is preferable to utilize lithium in an alloy form. Thus the preferred embodiment of the present invention is to use lithium in alloy form, for example as an alloy of copper and/or silver and/or magnesium and/or bismuth, and/or lead and/or thallium alloy. It is, therefore, preferred to utilize an alloy in which lithium is present in an amount less than 50 percent by weight. For example, copper-lithium alloys may be utilized in which lithium is present in an amount from about 0.1 to about 6 percent by weight. If it is desired to avoid partial melting during bonding the lithium should be present in an amount from 0.2 to about 2.5 percent by weight, and temperatures below the liquidus on the copper-lithium phase diagram avoided. However, the bonding proceeds more rapidly if partial melting does occur and processing in a dry, inert atmosphere using lithium contents and temperatures such that partial melting does occur can considerably speed the reaction rate.

If a silver lithium alloy is used the lithium content should be from about 4 to about 40 percent by weight. Preferably, however, the amount is about 10 to about 30 percent by weight lithium. Preferably, the bonding is carried out at a temperature above 330° C if avoidance of intermetallic formation is desired.

In the case of ternary alloys such as copper-silver-lithium the amount of lithium would be greater than about 2.5 weight percent lithium. The remainder may be silver and copper in any proportion.

Similarly if a bismuth addition is used, it should be present in an amount up to about 35 percent by weight bismuth, the remainder copper and/or silver, with lithium being present in an amount up to about 35 percent by weight.

Likewise, in the case of silver-lithium-lead or silver-lithium-thallium, lithium is present in an amount up to about 35 percent by weight with the balance either lead and/or silver in any proportion.

The method is carried out by placing a lithium or lithium alloy member between each member to be bonded together. Preferably, the lithium containing member is thin compared to the thickness of the members to be bonded together. There is generally no advantage in making the lithium member thick.

When the lithium member is in contact with the two members to be bonded together, the assembly is heated to a temperature up to about 600° C. Longer times are required at the lower temperatures and extremely long times required at temperatures below 150° C. At the higher temperatures a small amount of softening may take place due to a slight annealing effect in some alloys. However, the process does bond the members together and avoids the greater softening effect due to annealing which normally occurs during brazing. Brazing temperatures for most silver and copper alloys are above 600° C.

Pressure may be applied to the joints to be brazed together, for example a pressure of 1 to 50 pounds per square inch may be applied to the joint. Pressure does enhance diffusion and therefore some reduction in time required is often observed if pressure is applied to the members to be bonded. If sufficient pressure is utilized to mechanically deform the lithium containing member so that it at least partially fills at least some voids in the members to be bonded to facilitate diffusion of lithium across the interface.

The preferred temperature range is from about 330° C to about 500° C. It is within this temperature range that the least reduction of mechanical properties occurs. Reduction in mechanical properties is minimized by reducing either processing time or processing temperature.

It is to be emphasized that the difference in properties is very significant, for example, choosing CDA alloy number 102, oxygen-free-copper, the annealing effect may result in a yield strength of component copper near the joint as low as 10,000 psi. When this material is work hardened it will have a yield strength of 40,000 to 50,000 psi. From another standpoint the annealed material has a Rockwell F Scale hardness of 40 to 45 whereas the cold worked material has a hardness of 85 to 95 Rockwell F. Oftentimes the material to be bonded together is in the hard state prior to the brazing operation and the brazing operation reduces the strength and hardness considerably. Annealed CDA 220 commercial bronze (10 percent zinc) has an annealed yield strength of 10,000 psi and a hardened yield strength of 54,000 psi. Precipitation hardened beryllium-copper has an annealed tensile strength of 50,000 to 80,000 psi and in a precipitation hardened state a tensile strength of 165 to 185 psi.

Silver in the annealed state has a tensile strength of 22,000 psi and a cold rolled 50 percent tensile strength of 54,000 psi.

With respect to other properties of the bonded joints, the lithium does not appreciably reduce the thermal or electrical conductivity of the silver or copper members.

The method of heating may be any convenient method. The heat may be applied by a resistance furnace, a gas fired furnace, an induction furnace, or resistance heating may be utilized. The type of heating is entirely within designer choice with due regard to the particular conditions prevailing as to the shape of assembly and available furnaces.

The longer the members are maintained at temperature the further the lithium diffuses into each of the members until a substantially uniform concentration in the bonded article is obtained. Therefore, the concentration of lithium at any point is lower after additional time at temperature. There is concentration gradient as shown in FIG. 1 in each of the members to be bonded as one moves a distance away from the joint. Therefore, in those few applications where the small reduction in melting point due to the presence of lithium could cause problems extended heating within the indicated temperature range would so greatly diffuse the lithium that this effect would be essentially non-existent.

Obviously, the process could be carried out continuously by utilizing boats or belts through furnace. In addition to avoiding the reduction in strength and hardness, no intermetallics are formed with lithium bonding in copper members as is often the case with brazing alloy. In the event that one or more of the component members is a silver base material, formation of intermetallic compounds can be avoided by carrying out the bonding operation at a temperature above 330° C until the lithium has diffused into the silver member to the extent that the maximum lithium content is not above 5 weight w/o. Then the assembly may be cooled to room temperature and intermetallic compound formation will be avoided. A reduction in heating costs can sometimes be achieved over that where brazing alloys are used, because lower temperatures are used.

Where it is desired to shape or mechanically reduce the cross sectional area of the members to be bonded, the members to be bonded can be simultaneously heated and mechanically worked, for example with heated rolls, to effect simultaneous mechanical deformation and bonding.

EXAMPLE I

An example of the invention, attention is directed to FIG. 1–4 of the drawings. In this particular application, it is desired to bond a hardened 95% Ag 4.9 wt w/o copper 0.1% Ni member 11 to a tough pitch copper member 12. As is apparent from Figure 2 a layer of copper containing 2 percent lithium, 13 is placed between the members and then the assembly is heated to a temperature of 350° C for 6 hours.

Figure 3:
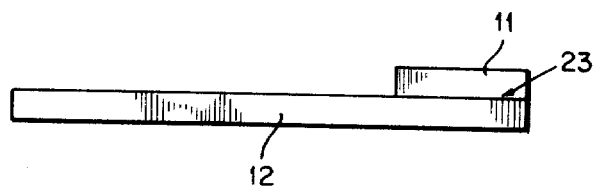
FIG. 3 is a side view of the assembly after bonding.
Figure 4A:
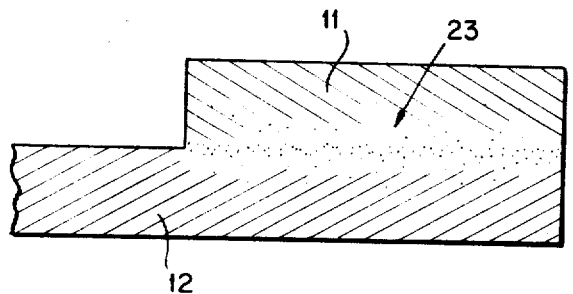
FIG. 4a is a sectional view through the bonded assembly.
Figure 4B:
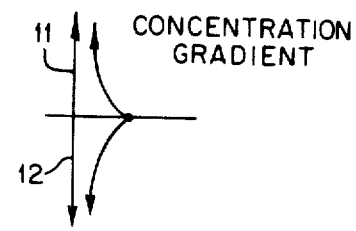
FIG. 4b shows the concentration gradient of lithium at the bonded interface and in the component members.

After the heating operation the assembly is as shown in FIG. 3. Only a small bond area 23 remains. The concentration of lithium in the bonded assembly may be as shown in FIG. 4b; the diffusion coefficients of lithium in the respective members determines the concentration gradient.

Tests made of the hardness before and after the bonding operation indicated that there was no substantial reduction in hardness and strength due to the bonding operation. Obviously, the particular materials and geometry are by way of example only.

EXAMPLE II

Two pieces of copper with reasonably flat surfaces were clamped together with a C-clamp with a 5-mil (0.005 inch) sheet of pure lithium separating the copper surfaces. The clamp was tightened to manual tightness. The assembly was heated for 4 days in an argon dry box at 200° C.

Figure 5:
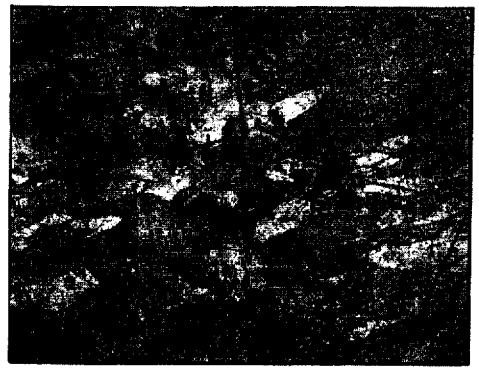
FIG. 5 is a photomicrograph at 160X showing the bonded microstructure.

Upon removal of the clamp the copper surfaces were extremely well bonded to one another and a metallograph section showed the copper grain growth occurred right across the initial boundaries as shown in FIG. 5 indicating excellent bond strength. Immersion in boiling water for 4 hours showed no porosity indicating extensive lithium diffusion and good corrosion strength of the joint.

EXAMPLE III

Two pieces of copper with reasonably flat surfaces were clamped together with a C-clamp with a 5-mil (0.005 inch) sheet of pure lithium separating the copper surfaces. The clamp was tightened to manual tightness.

The assembly was heated for 1 day in an argon dry box at 300° C.

Upon removal of the clamp the copper surfaces were extremely well bonded to one another and a metallograph section showed the copper grain growth occurred right across the initial boundaries indicating excellent bond strength. Immersion in boiling water for 4 hours showed no porosity indicating extensive lithium diffusion and good corrosion strength of the joint.

EXAMPLE IV

Two pieces of copper with reasonably flat surfaces were clamped together with a C-clamp with a 5-mil (0.005 inch) sheet of pure lithium separating the copper surfaces. The clamp was tightened to manual tightness.

The assembly was heated for 2 hours in an argon dry box at 350° C.

Upon removal of the clamp the copper surfaces were extremely well bonded to one another and a metallograph section showed the copper grain growth occurred right across the initial boundaries indicating excellent bond strength. Immersion in boiling water for 4 hours showed no porosity indicating extensive lithium diffusion and good corrosion strength of the joint.

EXAMPLE V

Two pieces of copper with reasonably flat surfaces were clamped together with a C-clamp with a 5-mil (0.005 inch) sheet of pure lithium separating the copper surfaces. The clamp was tightened to manual tightness.

The assembly was heated for 4 days in an argon dry box at 200° C but with a Cu-4 w/o Li alloy as the bonding spacer.

Upon removal of the clamp the copper surfaces were extremely well bonded to one another and a metallograph section showed the copper grain growth occurred right across the initial boundaries indicating excellent bond strength. Immersion in boiling water for 4 hours showed no porosity indicating extensive lithium diffusion and good corrosion strength of the joint.

Although this work was also carried out in a dry box it is believed that the reduced lithium content reduced the susceptability to oxygen contamination, relaxing the conditions which must be met in the dry box.

EXAMPLE VI

The bonding of silver to copper with lithium was carried out by placing a 5-mil lithium sheet between a block of silver and a block of copper and securing the entire assembly in a C-clamp.

Heating was carried out in an argon dry box for 2 days at 200° C followed by cooling to room temperature.

The resultant joint was of good quality with growth occurring across the bond area.

EXAMPLE VII

The bonding of silver to copper with lithium was carried out by placing a 5-mil lithium sheet between a block of silver and a block of copper and securing the entire assembly in a C-clamp.

Heating was carried out in an argon dry box for 2 hours at 400° C followed by cooling to room temperature.

The resultant joint was of good quality with growth occurring across the bond area.

EXAMPLE VIII

The bonding of copper to silver was carried out by placing a Cu-4 w/o Li sheet 5 mils thick between a surface of copper and a surface of silver, fastening the assembly with a C-clamp and heating the entire assembly in an argon dry box to 350° C and maintaining temperature for 4 days.

Bond quality was good with grains growing across the bonded area.

EXAMPLE IX

The bonding of copper to silver was carried out by placing a Cu-4 w/o Li sheet 5 mils thick between a surface of copper and a surface of silver, fastening the assembly with a C-clamp and heating the entire assembly in an argon dry box to 400° C and maintaining temperature for 2 hours.

Bond quality was good with grains growing across the bonded area.

EXAMPLE X

Examples 1-3 were repeated but the composition of the brazing material was 72.5 Ag-26.4 Cu-1.1 Li.

Similar results were obtained.

We claim:

1. A method of bonding a first member to a second member, said first member and said second member being made from a material selected from the group consisting of copper, copper alloys, silver and silver alloys comprising placing between the members to be bonded together a lithium or lithium containing alloy and heating the assembly to a temperature of from up to about 600° C for a time sufficient to bond the members together.

2. A method according to claim 1 wherein said first member is a copper member.

3. A method according to claim 1 wherein said first member is a copper alloy.

4. A method according to claim 1 wherein said first member is a silver member.

5. A method according to claim 1 wherein said first member is a silver alloy.

6. A method according to claim 1 wherein said first member is a refractory base composite containing a member selected from the group consisting of copper and silver.

7. A method according to claim 1 wherein said second member is a refractory base composite containing a member selected from the group consisting of copper and silver.

8. A method according to claim 1 wherein said second member is a copper member.

9. A method according to claim 1 wherein said second member is a copper alloy.

10. A method according to claim 1 wherein said second member is a silver member.

11. A method according to claim 1 wherein said second member is a silver alloy.

12. A method according to claim 1 wherein said lithium member is a lithium alloy.

13. A method according to claim 12 wherein said lithium alloy is an alloy of lithium and copper.

14. A method according to claim 12 wherein said alloy is an alloy of silver and lithium.

15. A method according to claim 12 wherein said lithium alloy is an alloy of magnesium and lithium.

16. A method according to claim 12 wherein said alloy is a ternary alloy.

17. A method according to claim 16 wherein said ternary alloy is a silver-copper-lithium alloy.

18. A method according to claim 16 wherein said ternary alloy is a copper-lithium-bismuth alloy.

19. A method according to claim 16 wherein said ternary alloy is a silver-lithium-bismuth alloy.

20. A method according to claim 16 wherein said ternary is a silver-lithium-lead alloy.

21. A method according to claim 16 wherein said ternary alloy is a silver-lithium-thallium alloy.

22. A method according to claim 1 wherein the assembly is heated to a temperature from 330° to 500° C.

23. A method according to claim 13 wherein said copper-lithium alloy contains from 0.1 to 6 percent lithium.

24. A method according to claim 23 wherein said copper-lithium alloy contains from 0.2 to 2.5 percent lithium.

25. A method according to claim 14 wherein said silver-lithium alloy contains from about 4 to 40 percent by weight lithium.

26. A method according to claim 25 wherein said lithium content is from 10 to 30 percent by weight.

27. A lithium bonded joint comprising a first member selected from the group consisting of silver, silver alloys, copper and copper alloys bonded to a second member selected from the group consisting of copper, copper alloys, silver and silver alloys, the interface between said bonded members defining a bonded joint, there being a concentration gradient of lithium from said interface into said first and second members with a maximum of said concentration gradient being at said interface.

28. An article according to claim 1 wherein said first member is a copper member.

29. An article according to claim 1 wherein said first member is a copper alloy.

30. An article according to claim 1 wherein said first member is a silver member.

31. An article according to claim 1 wherein said first member is a silver alloy.

32. An article according to claim 1 wherein said second member is a copper member.

33. An article according to claim 1 wherein said second member is a copper alloy.

34. An article according to claim 1 wherein said second member is a silver member.

35. An article according to claim 1 wherein said second member is a silver alloy.

36. An article according to claim 33 wherein said copper alloy is selected from the group consisting of brasses, bronzes and cupro-nickels.

37. An article according to claim 29 wherein said copper alloy is selected from the group consisting of brasses, bronzes and cupro-nickels.

38. An article according to claim 31 wherein said silver member is an alloy containing a member selected from cadmium, copper, nickel and lead.

39. An article according to claim 38 wherein the lithium constitutes not above 40% by weight when at least one of the bonded components is a silver member.

40. An article according to claim 38 wherein the maximum concentration of lithium is not more than 3% when the assembly is made of copper or copper alloys.

41. An article according to claim 33 wherein the copper alloy contains an additive selected from the group consisting of chromium, beryllium, cobalt, nickel, silicon, aluminum, tin, and manganese.

42. An article according to claim 33 wherein the copper alloy contains an additive selected from the group consisting of chromium, beryllium, cobalt, nickel, silicon, aluminum, tin and manganese.

* * * * *